(12) United States Patent
Oesterreicher et al.

(10) Patent No.: US 8,336,074 B2
(45) Date of Patent: *Dec. 18, 2012

(54) SYSTEM AND METHOD FOR FACILITATING FAST-FORWARDING OF FIRST-RUN PROGRAMS

(76) Inventors: Richard T. Oesterreicher, Naples, FL (US); Craig Murphy, Kirkland, WA (US)

(*) Notice: Subject to any disclaimer, the term of this patent is extended or adjusted under 35 U.S.C. 154(b) by 1439 days.

This patent is subject to a terminal disclaimer.

(21) Appl. No.: 11/402,184

(22) Filed: Apr. 10, 2006

(65) Prior Publication Data

US 2006/0188222 A1 Aug. 24, 2006

Related U.S. Application Data

(63) Continuation of application No. 10/406,042, filed on Apr. 2, 2003, now Pat. No. 7,194,188.

(51) Int. Cl.
*H04N 7/173* (2011.01)
(52) U.S. Cl. .................................................. 725/89
(58) Field of Classification Search .......... 725/114–122, 725/131, 133, 134, 141, 142, 89; 386/46
See application file for complete search history.

(56) References Cited

U.S. PATENT DOCUMENTS

| | | | |
|---|---|---|---|
| 4,361,730 A | 11/1982 | Barber et al. | |
| 4,506,387 A | 3/1985 | Walter | 455/612 |
| 5,027,400 A | 6/1991 | Baji et al. | 380/20 |
| 5,412,416 A | 5/1995 | Nemirofsky | |
| 5,442,390 A | 8/1995 | Hooper et al. | 348/7 |
| 5,659,539 A | 8/1997 | Porter et al. | 395/200.61 |
| 5,694,334 A * | 12/1997 | Donahue et al. | 709/247 |
| 5,701,582 A | 12/1997 | DeBey | 455/5.1 |
| 6,172,674 B1 | 1/2001 | Etheredge | |
| 6,253,375 B1 | 6/2001 | Gordon et al. | 725/88 |
| 6,591,420 B1 * | 7/2003 | McPherson et al. | 725/29 |
| 6,738,980 B2 | 5/2004 | Lin et al. | 725/88 |
| 6,834,110 B1 * | 12/2004 | Marconcini et al. | 380/239 |
| 7,194,188 B2 * | 3/2007 | Oesterreicher et al. | 386/68 |
| 7,228,437 B2 * | 6/2007 | Spagna et al. | 713/193 |
| 7,870,593 B2 * | 1/2011 | Stuckman et al. | 725/142 |

(Continued)

FOREIGN PATENT DOCUMENTS

WO WO 95/32586 * 11/1995

(Continued)

OTHER PUBLICATIONS

U.S. Appl. No. 11/468,540, filed Aug. 30, 2006, Oesterreicher et al.

(Continued)

*Primary Examiner* — David Harvey

(57) ABSTRACT

A system and method are disclosed for facilitating fast-forwarding by viewers through a first-run program beyond the current broadcast point. In one embodiment, the first-run program is distributed before its scheduled publication time, and may be viewed at any time after the publication time. In a second embodiment, content is distributed on or after the publication time, but at a rate greater than the normal viewing rate. In a third embodiment, content is distributed on demand after the publication time by a media distribution server. In a fourth embodiment, a viewer participating in a multicast session of the content requests content beyond the current broadcast point. The viewer is switched to a unicast session, and the requested content is transmitted to the viewer. In alternative embodiments, a release code may be provided to control the time after which the viewer will be permitted to view program segments beyond the current broadcast point.

19 Claims, 7 Drawing Sheets

U.S. PATENT DOCUMENTS

| | | | |
|---|---|---|---|
| 2001/0053277 A1 | 12/2001 | Jun et al. | 386/70 |
| 2002/0114331 A1 | 8/2002 | Cheung et al. | |
| 2002/0174430 A1 | 11/2002 | Ellis et al. | |
| 2003/0061607 A1* | 3/2003 | Hunter et al. | 725/32 |
| 2003/0093801 A1 | 5/2003 | Lin et al. | |
| 2003/0105809 A1* | 6/2003 | Yoshii et al. | 709/203 |
| 2003/0110504 A1 | 6/2003 | Plourde, Jr. et al. | 725/89 |
| 2003/0208767 A1 | 11/2003 | Williamson et al. | 725/93 |
| 2004/0078829 A1 | 4/2004 | Patel et al. | 725/135 |
| 2004/0111756 A1* | 6/2004 | Stuckman et al. | 725/142 |
| 2004/0117839 A1* | 6/2004 | Watson et al. | 725/87 |
| 2004/0133923 A1* | 7/2004 | Watson et al. | 725/134 |
| 2004/0177369 A1* | 9/2004 | Akins, III | 725/31 |
| 2006/0181606 A1 | 8/2006 | Oesterreicher et al. | |
| 2006/0188222 A1 | 8/2006 | Oesterreicher et al. | |

FOREIGN PATENT DOCUMENTS

WO     WO2004/091186     10/2004

OTHER PUBLICATIONS

U.S. Appl. No. 11/468,596, filed Aug. 30, 2006, Oesterreicher et al.
United States Patent and Trademark Office: Restriction Requirement dated Sep. 27, 2004, U.S. Appl. No. 10/406,042, filed Apr. 2, 2003.
United States Patent and Trademark Office: Non-Final Office Action dated Feb. 10, 2005, U.S. Appl. No. 10/406,042, filed Apr. 2, 2003.
United States Patent and Trademark Office: Final Office Action dated Aug. 24, 2005, U.S. Appl. No. 10/406,042, filed Apr. 2, 2004.
United States Patent and Trademark Office: Notice of Allowance dated Feb. 9, 2006, U.S. Appl. No. 10/406,042, filed Apr. 2, 2005.
PCT International Preliminary Report on Patentability issued Nov. 27, 2008, in corresponding International Application No. PCT-US2004/010054.
PCT International Search Report mailed Nov. 10, 2008, in corresponding International Application No. PCT-US2004/010054.
Application as Filed on Apr. 10, 2006; U.S. Appl. No. 11/401,605; Oesterreicher et. al.
Non-Final Office Action mailed Mar. 17, 2010; U.S. Appl. No. 11/401,605.
Notice of Allowance mailed Aug. 19, 2010; U.S. Appl. No. 11/401,605.
Notice of Allowance mailed Dec. 9, 2010; U.S. Appl. No. 11/401,605.
Notice of Allowance mailed Mar. 31, 2011; U.S. Appl. No. 11/401,605.
PCT International Search Report mailed Apr. 2, 2009, in corresponding International Application No. PCT/US2004/010054.
Prabhakaran et al., "High Throughput Data Transfers using the Tornado Transport Protocol".
Luby et al., "Practical Loss-Resilient Codes," ITW, San Diego, CA, Feb. 8, 1998.
Luby et al., "Analysis of Low Density Codes and Improved Designs Using Irregular Graphs," 1997.
Grand National Press, "What is Video on Demand (VOD)?" <http://www.itvdictionary.com/vod.html> (visited Mar. 19, 2003).

* cited by examiner

SYSTEM AND METHOD FOR FACILITATING FAST-FORWARDING OF FIRST-RUN PROGRAMS

CROSS-REFERENCE TO RELATED APPLICATIONS

This application is a continuation of U.S. application Ser. No. 10/406,042, now U.S. Pat. No. 7,194,188, filed Apr. 2, 2003, which is hereby incorporated by reference in its entirety. This application is also related to co-pending U.S. application Ser. No. 11/401,605 entitled "System and Method for Facilitating Fast-Forwarding of First-Run Programs,", filed on even date herewith.

FIELD OF THE INVENTION

This invention relates to the field of digital media servers.

BACKGROUND OF THE INVENTION

First-run programs are pre-produced television programs initially broadcast by television stations owned or affiliated with a television network. Thus, for example, an episode of the popular television program ER$^{SM}$ is a first-run program when initially broadcast. By contrast, the film "Star Wars" is not a first-run program, even when first broadcast by a television station, since it was originally distributed in movie theaters. In addition, live programs such as live broadcasts of sporting events are not first-run programs since they are not pre-produced.

In the past, television viewers viewing a first-run program were unable to utilize advanced viewing features such as fast-forward, rewind, and slow motion, since the content of such programs was broadcast to viewers in "real-time," where each frame of video and audio is viewed by the user at the same instant that it is broadcast, except for any transmission delays. Unless otherwise specified, the term broadcast as used herein refers to a broadcast at the normal viewing rate. More recently, however, the advent of personal video recorders (PVRs) has made some of these advanced viewing features available to viewers.

PVRs record first-run and other programs as they are broadcast. PVRs also provide viewers with time-shifting features including pause, rewind, and fast-forward functions, but only with respect to content that has already been broadcast.

Both client-side (i.e., at the viewer's location) and server-side (i.e., at the broadcaster's location) PVRs have been implemented. Some client-side PVRs, such as those integrating TiVo and Replay TV services, record live incoming program feeds of any type onto a local hard drive at the viewer's location. Others, including ShowShifter and WinTV, enable viewers to record and play back television programs through video capture cards on their home computers.

Server-side PVRs are typically maintained by digital media service providers, such as cable operators, satellite providers, telephone companies, or Internet streaming service providers. In contrast to client-side PVRs, server-side PVRs share stored content between all viewers in a geographic region. Instead of gigabytes (tens of hours) of space on a single client-side device, server-side PVRs are capable of storing terabytes (tens of thousands of hours) of digital content in one location. Accordingly, server-side PVRs provide viewers with access to large content libraries.

Although existing PVR solutions have the ability to fast-forward, rewind, and pause the portion of a first-run program that has already been broadcast, they do not have the ability to fast-forward to a point in the program beyond the current broadcast point, i.e., the point in a first-run program that would currently be displayed on a television receiver if the program was viewed normally beginning at its scheduled publication time. Consequently, viewers wishing to fast-forward through commercials or portions of a program that are not of interest cannot watch the desired portion of the program until after a substantial portion of the program has been broadcast. This drawback of the prior art is illustrated in connection with FIGS. 1 and 2.

As shown in FIG. 1, first-run programs are typically sent via a plurality of transmission paths. More specifically, a source 110 transmits the program through a network broadcast operations center 120 via satellite 130 to a number of re-distributors 140-170, including direct-broadcast satellite (DBS) providers 140, network affiliates 150, cable television providers 160, and telephone companies 170. Each re-distributor 140-170 has some form of access into viewer homes and delivers the program via a suitable transport mechanism. For example, DBS providers 140 re-transmit the program over another satellite 145; network affiliates 150 broadcast from a terrestrial transmitter 155; cable television providers 160 distribute the signal using a hybrid fiber optic and coaxial cable network 165; and telephone companies 170 use a combination of fiber optic and twisted pair cables 175 (telephone lines) to distribute the program to the viewer. Each method of distribution may or may not require additional viewer-premises equipment 147, 157, 167, 177 for viewing the program on a television receiver 180.

FIGS. 2A-2D graphically illustrate the temporal relationship between the transmission and reception of an exemplary first-run program in the prior art. Each square in FIGS. 2A-2D represents an amount of time, t. The vertical line TSB represents the scheduled publication time for the first-run program, i.e., the time at which broadcast of the first-run program is to commence. The time period to the left of TSB is referred to herein as the prepublication period, and the time period to the right is referred to herein as the post-publication period.

FIG. 2A illustrates an example of a first-run program comprising a plurality of segments A through E, having a duration of St. It should be recognized that the division into five segments shown in FIG. 2A is purely exemplary. Each program may be conceptualized as comprising any number of segments N, each of time t, where N*t is the total program length. Thus, for example, a segment may be defined to represent 12 minutes of a program (as in the case of a one hour program divided into five segments such as segments A-E in FIG. 2A), one minute of a program, one second of a program, a single video frame of a program, or any other desired amount of a program.

The blocks in FIG. 2A indicate that the publisher (i.e., operator of network broadcast operation center 120) is in full possession of the program content at time (TsB-t). As of that time, the program has not been transmitted or viewed since the current time has not yet reached TsB.

Once TsB is reached, publication of the program commences. In each time interval, a program segment of duration t is broadcast to the receiver, as indicated in FIG. 2B by the bold segment lettering in the lower row.

As content is broadcast, it is displayed by the receiver, as shown in FIG. 2C. This sequence continues until the end of the program. Since segment A is not stored by the receiver, it no longer appears on the lower row. Segments C through E also do not appear on the lower row since they have not yet been broadcast. Consequently, the viewer cannot fastforward or rewind the program because the television receiver does not store broadcast content but simply displays such content as it is received.

A PVR device provides the user with additional functions by recording previously broadcast segments. More specifically, as shown in FIG. 2D, the PVR recording provides the ability to time-shift program content so that the user may pause, rewind, and fast-forward, but only within the scope of content that has already been broadcast. Thus, in FIG. 2D, since segments C through E have not yet been broadcast, the PVR cannot fastforward beyond the end of segment B.

SUMMARY OF THE INVENTION

A system and method are disclosed that allow viewers to fast forward beyond the current broadcast point of a first-run program.

In one aspect, the present invention is directed to a method of distributing first-run programming content to a viewer, comprising: digitally encoding first-run programming content having a scheduled publication time, the first-run programming content comprising a plurality of segments, each segment having a segment publication time; loading the digitally encoded content onto a media distribution server; transmitting the content to a recording device at the viewer's location prior to the publication time; selecting by the viewer a desired segment for viewing, said desired segment being beyond the current broadcast point; and viewing the desired segment on a display after the scheduled publication time and before the segment publication time.

In another aspect of the present invention, the method further comprises receiving a release code which permits said viewing.

In another aspect, the present invention is directed to a system for distributing first-run programming content to a viewer, comprising: a media distribution server adapted to store digitally encoded first-run programming content having a scheduled publication time, the first-run programming content comprising a plurality of segments, each segment having a segment publication time, the server further adapted to transmit the content; a recording device at a viewer's location adapted to receive said segments and select a desired segment for viewing, said desired segment being beyond the current broadcast point; and a display for viewing the desired segment after the scheduled publication time and before the segment publication time.

In another aspect of the present invention, the recording device is further adapted to receive a release code which permits said viewing.

In another aspect; the present invention is directed to a system for distributing first-run programming content to a viewer, comprising: a media distribution server adapted to store digitally encoded first-run programming content having a scheduled publication time, the first-run programming content comprising a plurality of segments, each segment having a segment publication time, the server further adapted to transmit the content; a recording device at a viewer's location adapted to receive said segments and select a desired segment for viewing, said desired segment being beyond the current broadcast point; and a display for viewing the desired segment after receiving a release code which permits said viewing.

In another aspect, the present invention is directed to a method of distributing first-run programming content to a viewer, comprising: digitally encoding first-run programming content having a scheduled publication time; loading the digitally encoded content onto a media distribution server; digitally transmitting the content at or after the publication time at a rate greater than the normal viewing rate; the viewer selecting desired program content for viewing, said desired program content being beyond the current broadcast point; and viewing the desired program content on a display.

In another aspect of the present invention, the method further comprises receiving a release code which permits said viewing.

In another aspect, the present invention is directed to a method of distributing first-run programming content to a viewer, comprising: digitally encoding first-run programming content having a scheduled publication time; loading the digitally encoded content onto a media distribution server; a viewer requesting transmission of desired content from the first-run programming content, said desired content being beyond the current broadcast point; digitally broadcasting the desired content on or after the publication time; and viewing the desired content on a display.

In another aspect of the present invention, the method further comprises receiving a release code to permit said broadcasting and viewing.

In another aspect, the present invention is directed to a method of distributing first-run programming content to a viewer, comprising: digitally encoding first-run programming content having a scheduled publication time; loading the digitally encoded content on to a media distribution server; digitally multicasting the content at the publication time at the normal viewing rate; receiving a request from a viewer for program content beyond the current broadcast point; transferring the viewer from the multicasting to a unicast session; digitally transmitting the content in the unicast session; and viewing the desired program content on a display.

In another aspect of the present invention, the step of digitally transmitting further comprises transmitting the content at a rate greater than the normal viewing rate.

In another aspect of the present invention, the step of digitally transmitting further comprises transmitting the content at a rate equal to a requested fast-forwarding rate.

In another aspect of the present invention, the method further comprises receiving a release code to permit said transferring, digitally transmitting, and viewing.

DETAILED DESCRIPTION OF ILLUSTRATIVE EMBODIMENTS

Figure 1:
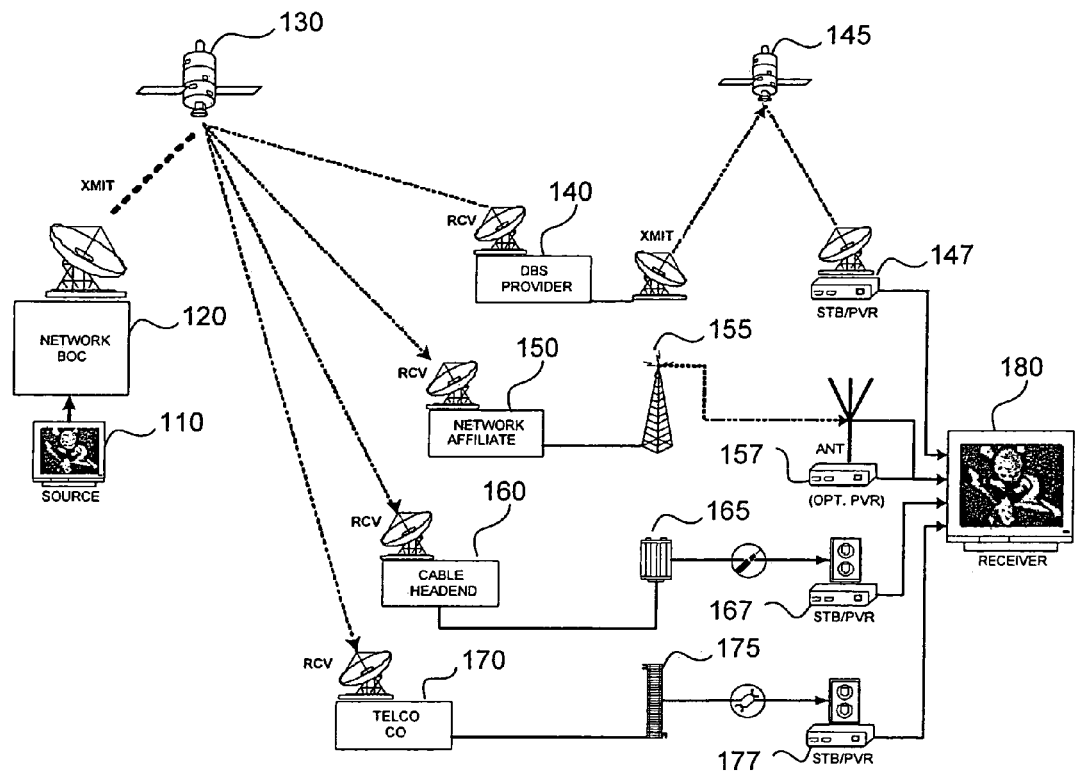
FIG. 1 is a block diagram that illustrates distribution paths for a first-run program.
Figure 2A:
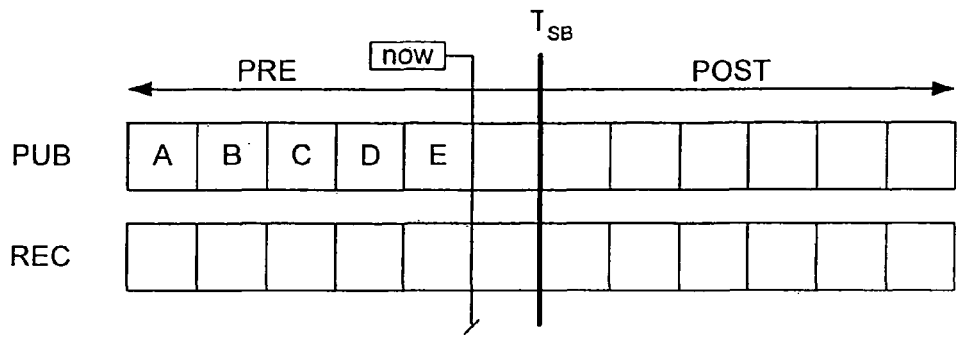
FIG. 2A is a temporal diagram that illustrates a first-run program before broadcast in the prior art.
Figure 2B:
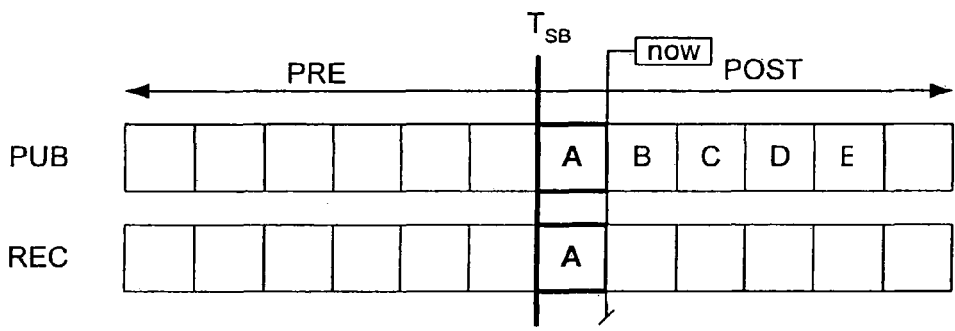
FIG. 2B is a temporal diagram that illustrates publication and viewing of a first-run program in the prior art.
Figure 2C:
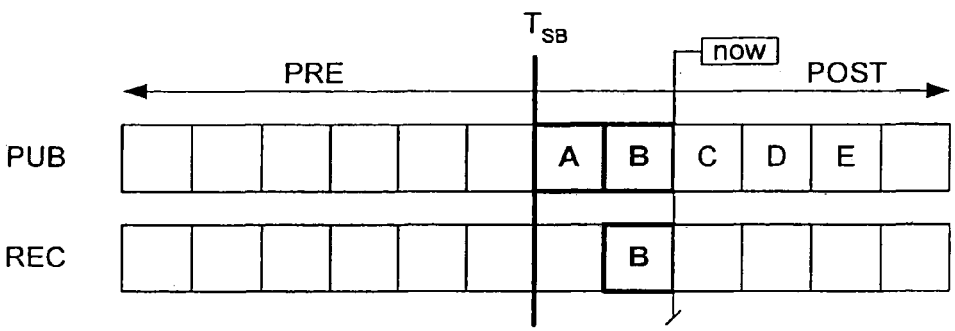
FIG. 2C is a temporal diagram that further illustrates publication and viewing of a first-run program in the prior art.
Figure 2D:
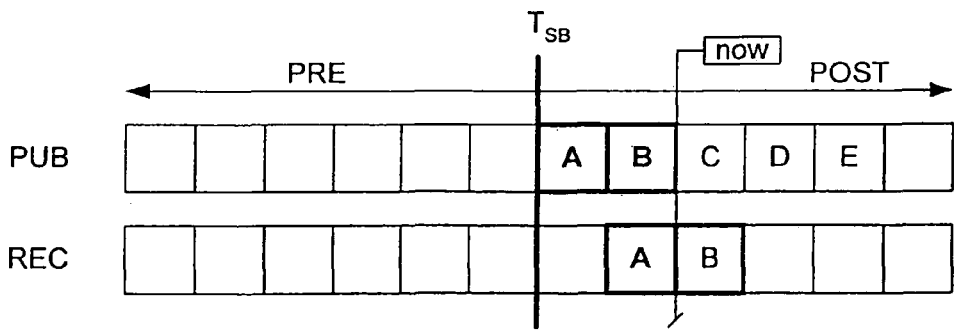
FIG. 2D is a temporal diagram that illustrates recording and later viewing of a first-run program in the prior art.
Figure 3:
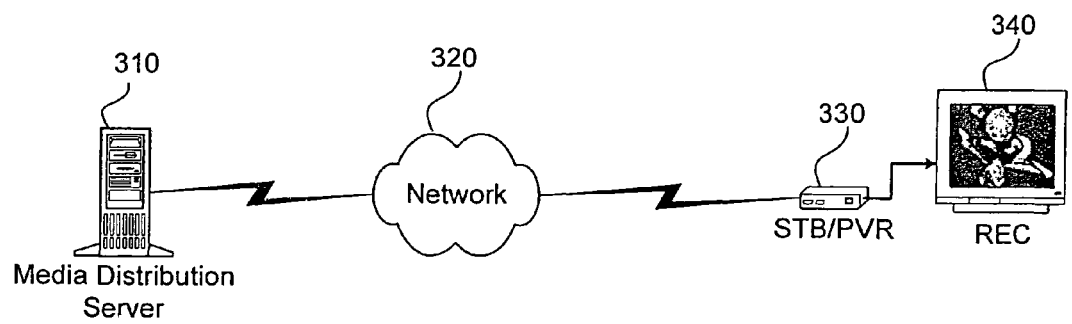
FIG. 3 is a block diagram that illustrates a preferred embodiment of the present system.

A preferred embodiment for implementing the present system and method is described in connection with FIG. 3. As shown in FIG. 3, a media distribution server 310 is preferably provided for storing digitally encoded first-run programs. Media distribution server 310 may, for example, be a video-on-demand server.

Media distribution server 310 is preferably adapted to transmit content across a communications network 320 to a set-top box 330. Set-top box 330 supplies received content to receiver 340 so that it maybe viewed. Set top-box 330 is preferably provided with PVR capability.

Figure 4:
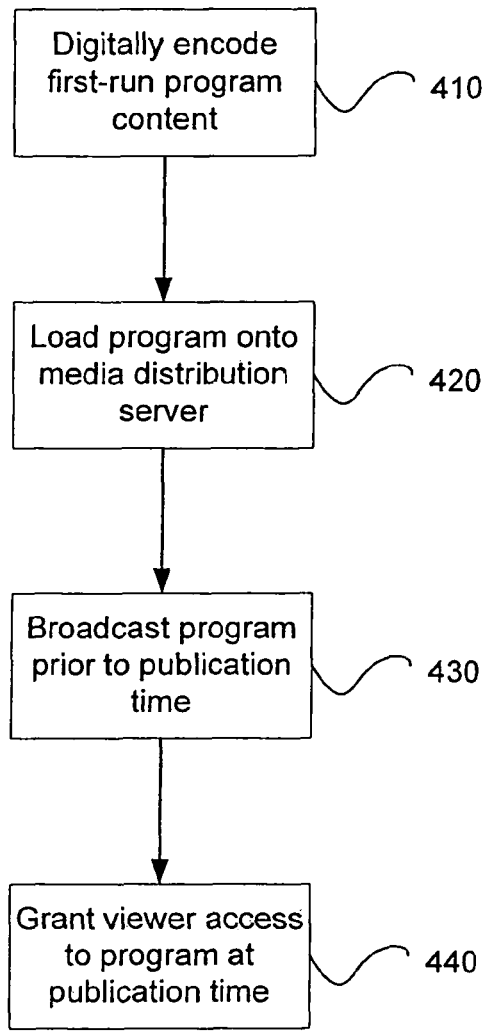
FIG. 4 is a flow chart that illustrates one preferred embodiment for distributing first-run programs.

FIG. 4 is a flow chart that illustrates one preferred embodiment for distributing first-run programs. As shown in FIG. 4, in step 410, a first-run program is digitally encoded. In step 420, the program is loaded onto media distribution server 310. In step 430, the entire program is digitally broadcast or otherwise transmitted to the viewer's premises prior to the scheduled publication time TSB. In a preferred embodiment, set-top box 330 is preferably adapted to block viewer access to the stored first-run program content before TSB. In step 440, the viewer submits a request for a segment of the first-run program beyond the current broadcast point. In one preferred embodiment, the request may be a request to fast forward the program ("fast-forward" request). Alternatively, the request may be to jump to a specified time point in the program ("random-access" request). h1 step 450, on or after the publication time has been reached, set-top box 330 displays the requested segment of the first-run program on receiver 340. Because set-top box 330 has recorded the entire program prior to the scheduled publication time TSB, it can thus permit the viewer to fast-forward or access any point in the first-run program.

Figure 5:
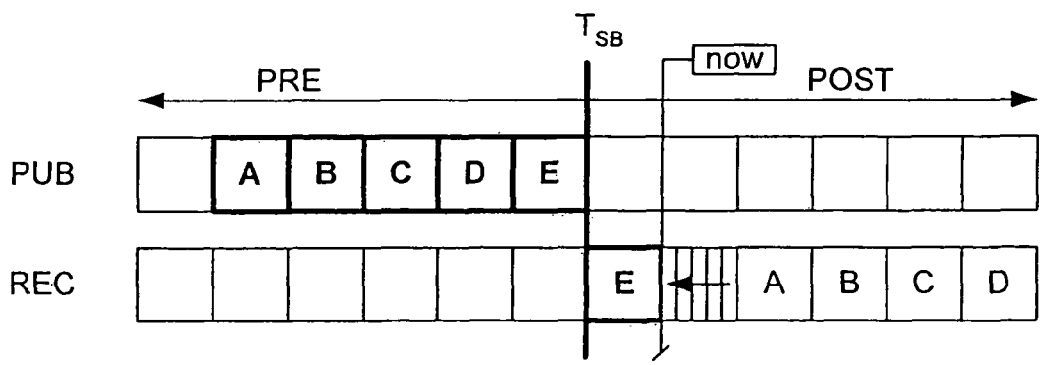
FIG. 5 is a temporal diagram that further illustrates the preferred embodiment of FIG. 4.

FIG. 5 is a temporal diagram further illustrating this preferred embodiment and one exemplary viewing scenario that it makes possible. As shown in FIG. 5, all program segments A-E are broadcast or otherwise transmitted to set-top box 330 prior to time TSB. The viewer may then, for example, view the last segment of the program (segment E) . . . immediately following Ts]3. After viewing, segment E, the viewer may rewind the program and view the remainder of the program beginning with the first segment (segment A).

In an alternative preferred embodiment, a release code may be provided to the set-top box to control the time after which the viewer will be permitted to view program segments beyond the current broadcast point. More specifically, set-top box 330 may be adapted to respond to viewer requests for program segments beyond the current broadcast point only after it receives an appropriate release code authorizing it to do so. This code may, for example, be embedded in the broadcast version of the program or separately transmitted to the media distribution server for forwarding to the set-top box. Alternatively, the release code may be sent directly to the set-top box.

Figure 6:
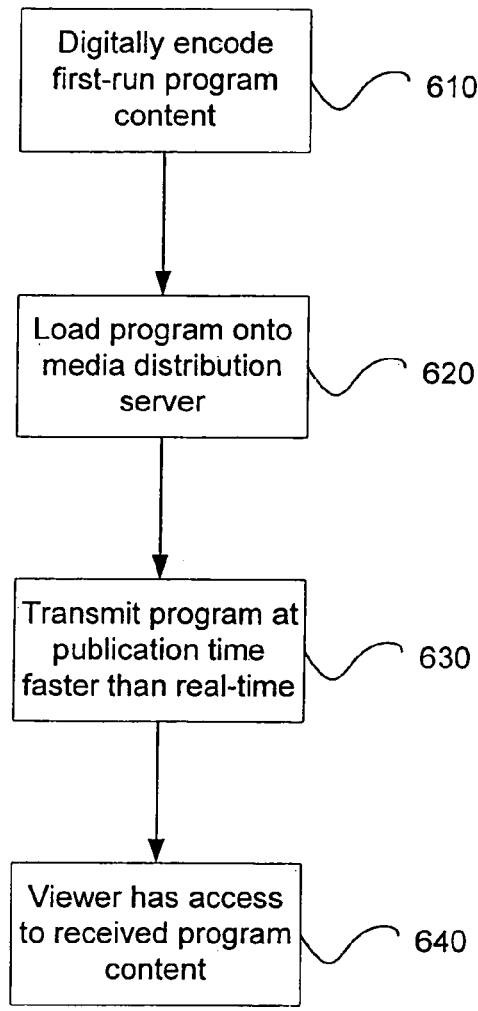
FIG. 6 is a flow chart that illustrates a second preferred embodiment for distributing first-run programs.

FIG. 6 illustrates an alternative preferred embodiment for distributing first-run programs. In this preferred embodiment, media distribution server 310 is adapted to transmit the program at a rate faster than the normal viewing rate. Set-top box 330 is adapted to receive the program at the transmitted rate and to record the received transmission. More specifically, in step 610, a first-run program is digitally encoded. In step 620, the program is loaded onto media distribution server 310. At time TSB, the program is broadcast or otherwise transmitted to set-top box 330, but at a rate greater than the normal viewing rate (step 630). In step 640, the viewer requests a segment of the first-run program which has already been transmitted to set-top box 330, but is beyond the current broadcast point. In step 650, set-top box 330 displays the requested segment of the first-run programs on receiver 340.

Figure 7:
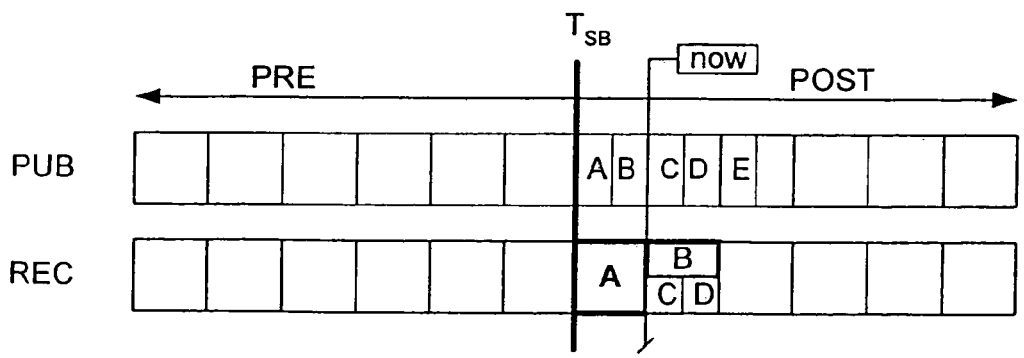
FIG. 7 is a temporal diagram that further illustrates the preferred embodiment of FIG. 6.

FIG. 7 is a temporal diagram that further illustrates this preferred embodiment and one exemplary viewing scenario that it makes possible. As shown in FIG. 7; program segments are transmitted to the viewer at a rate greater than the normal viewing rate. Thus, for example, segments A and B may preferably be transmitted in a time t, the normal broadcast time for a single segment. Using set-top box 330, the viewer can access any program segment, or portion thereof that has been received. More specifically, in the exemplary scenario of FIG. 7, by time (TsB+t), set-top box 330 has received segments A through B of the program, and can fast-forward through the end of segment B. Moreover, if the viewer watches segment B at normal speed beginning at time (TSB+t), set-top box 330 will receive segments C and D by the time viewing of segment B is complete. The viewer can then fast forward through segments C and D of the program or randomly access any point in those segments. Finally, the viewer can fast forward through the program at a fast forwarding rate less than or equal to the transmission rate at any time after TSB.

Figure 8:
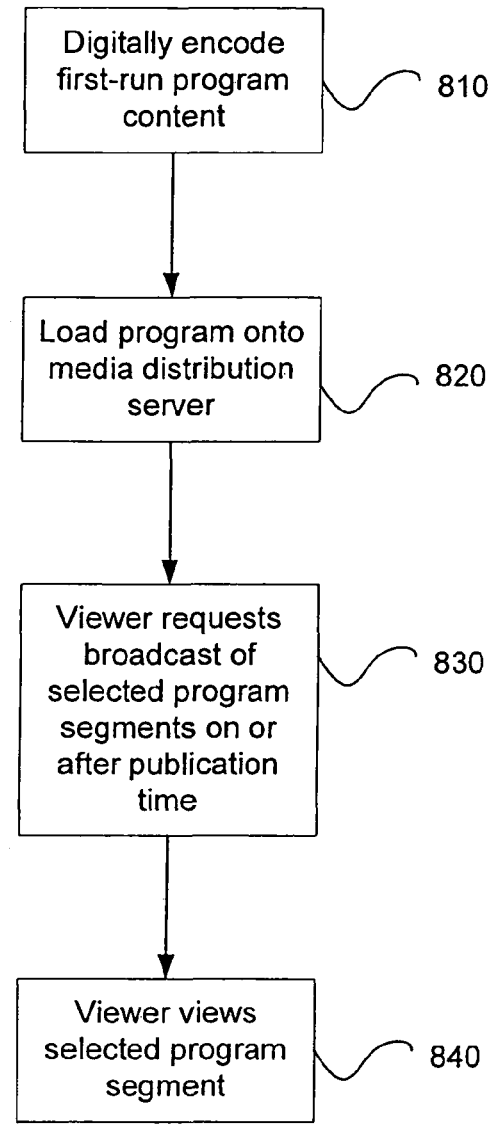
FIG. 8 is a flow chart that illustrates a third preferred embodiment for distributing first-run programs.

FIG. 8 illustrates another alternative preferred embodiment for distributing first-run programs. In this preferred embodiment, media distribution server-310 is adapted to act as a server-side PVR, supplying first-run program content as demanded. In a preferred embodiment, media distribution server 310 may be adapted to supply first-run program content only after the scheduled publication time TSB. In this embodiment, set-top box 330 need not have PVR capability.

More specifically, In step 810, a first-run program is digitally encoded. In step 820, the program is loaded onto media distribution server 310. In step 830, the viewer requests a segment of the first-run program beyond the current broadcast point. In a preferred embodiment, the server is adapted to respond to the viewer's request only after TSB has been reached. In step 840, the requested segment is broadcast or otherwise transmitted to set-top box 330 and displayed for the viewer.

In a preferred embodiment, a release code transmitted to the media distribution server may also be used to control the point at which the media distribution server will transmit program segments beyond the current broadcast point. More specifically, the media distribution server may be adapted to respond to viewer requests for program segments beyond the current broadcast point only after it receives an appropriate release code authorizing it to do so. This code may, for example, be embedded in the broadcast version of the program or separately transmitted to the media distribution server at some time after the scheduled publication time. Thus, a release code may be used to control the point at which the viewer will be permitted to view a segment of the program beyond the current broadcast point.

Figure 9:
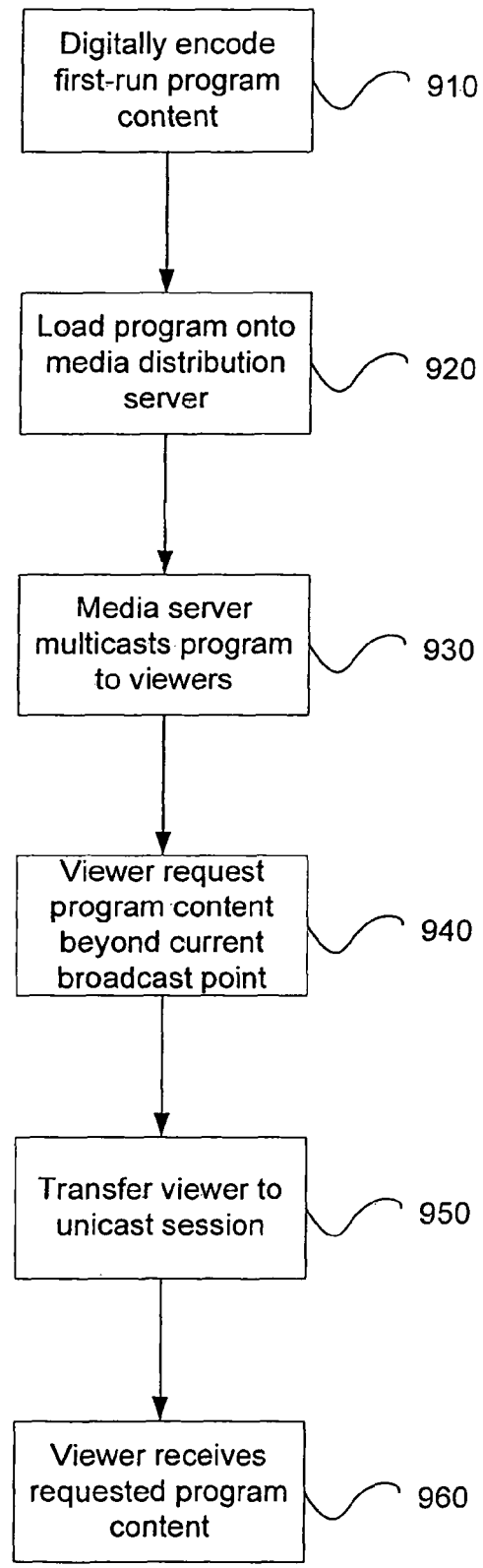
FIG. 9 is a flow chart that illustrates a fourth preferred embodiment for distributing first-run programs.

FIG. 9 illustrates another preferred embodiment for distributing first-run programs. More specifically, in step 910, a first-run program is digitally encoded. In step 920, the program is loaded onto media distribution server 310. In step 930, at time TSB, media distribution server 310 multicasts the program to more than one viewer's set-top box 330. Next in step 940, a viewer requests fast forwarding or random access to a segment in the first-run program beyond the current broadcast point. In step 950, media distribution server 310 seamlessly transfers the viewer's set-top box 330 from the multicast session to a unicast session, and then transmits the requested segments of the program to set-top box 330. In an alternative embodiment, the transmission is at a rate greater than the normal viewing rate. In another alternative embodiment, the transmission rate is equal to the requested fastforwarding rate. In step 960, set-top box 330 displays the requested segments of the first-run program on receiver 340.

In a preferred embodiment, release codes transmitted to the media distribution server may also be used to control the point at which the media distribution server will unicast the program. More specifically, the media distribution server may be adapted to respond to viewer requests for program segments beyond the current broadcast point only after it receives an appropriate release code authorizing it to do so. This code may, for example, be embedded in the broadcast version of the program or separately transmitted to the media distribution server at some time after the scheduled publication time. Thus, a release code may be used to control the point at which the viewer will be permitted to view a segment of the program beyond the current broadcast point.

While the invention has been described in conjunction with specific embodiments, it is evident that numerous alternatives, modifications, and variations will be apparent to those persons skilled in the art in light of the foregoing description.

What is claimed:

1. A method of distributing first-run programming content to a viewer, said method comprising:
    digitally encoding first-run programming content having a scheduled publication time, said first-run programming content comprising a plurality of segments, wherein at least one segment has an associated segment publication time, and wherein the segment publication time occurs after the scheduled publication time and corresponds to a time at which the at least one segment is broadcast by a broadcast system;
    prior to said scheduled publication time, transmitting said digitally encoded first-run programming content to a recording device; and
    transmitting a release code to the recording device to enable playback of the digitally encoded first-run programming content, wherein said release code enables said at least one segment to playback before said associated segment publication time.

2. The method of distributing first-run programming content of claim 1, wherein said release code accompanies a broadcast version of the first-run programming content.

3. The method of distributing first-run programming content of claim 1, wherein said release code permits viewing a segment of said digitally encoded first-run programming content beyond a current broadcast point.

4. The method of distributing first-run programming content of claim 1, wherein said release code permits fast-forwarding the at least one segment of said digitally encoded first-run programming content.

5. A media distribution server for distributing first-run programming content to a viewer, said media distribution server comprising:
    a storage device to store at least one digitally encoded first-run program segment, wherein said digitally encoded first-run program segment has an associated segment publication time that occurs after the scheduled publication time and corresponds to a time at which the digitally encoded first-run program segment is broadcast by a broadcast system; and
    a network configured to transmit said digitally encoded first-run program segment and a release code, wherein said release code enables said digitally encoded first-run program segment to playback before said associated segment publication time.

6. The media distribution server of claim 5, wherein said release code accompanies a broadcast version of the first-run programming content.

7. The media distribution server of claim 5, wherein said release code permits viewing a segment of said digitally encoded first-run programming content beyond a current broadcast point.

8. The media distribution server of claim 5, wherein said release code permits fast-forwarding at least one segment of said digitally encoded first-run programming content.

9. A recording device for receiving and replaying first-run programming content, said recording device comprising:
    a set-top box configured to receive a digitally encoded first-run programming content segment from a digital media server, wherein said digitally encoded first-run program segment is a portion of a digitally encoded first-run program, and wherein said digitally encoded first-run program segment has an associated segment publication time that occurs after the scheduled publication time and corresponds to a time at which the digitally encoded first-run programming content segment is broadcast by a broadcast system;
    a set-top box configured to block access to said digitally encoded first-run program segment until a scheduled publication time associated with said digitally encoded first-run program; and
    a set-top box configured to replay said digitally encoded first-run programming content segment after said scheduled publication time and before said segment publication time.

10. The recording device of claim 9, further comprising a mechanism adapted to select said digitally encoded first-run programming content segment for replay prior to a segment publication time.

11. The recording device of claim 9, further comprising a mechanism adapted to receive a release code, wherein said release code permits selecting said digitally encoded first-run programming content segment for replay prior to a segment publication time.

12. The recording device of claim 9, wherein said recording device is coupled to a display.

13. A method of distributing first-run programming content, said method comprising:
    digitally encoding first-run programming content having a scheduled publication time, said first-run programming content comprising a plurality of segments, wherein at least one segment has an associated segment publication time, and wherein the segment publication time occurs after the scheduled publication time and corresponds to a time at which the at least one segment is broadcast by a broadcast system; and
    digitally transmitting the digitally encoded first-run programming content at or after said scheduled publication time at a rate greater than a normal viewing rate, wherein said at least one segment is enabled to playback before said associated segment publication time.

14. The method of distributing first-run programming content of claim 13, further comprising transmitting the at least one segment after the scheduled publication time and before the segment publication time.

15. The method of distributing first-run programming content of claim 13, further comprising receiving said digitally encoded first-run programming content at a recording device at said rate greater than a normal viewing rate while replaying said digitally encoded first-run programming content at a normal viewing rate.

16. The method of distributing first-run programming content of claim 14, further comprising digitally transmitting a release code.

17. A method of distributing first-run programming content, said method comprising:

broadcasting digitally encoded first-run programming content on or after a scheduled publication time, said first-run programming content comprising at least one segment, wherein the at least one segment has an associated segment publication time that occurs after the scheduled publication time and corresponds to a time at which the at least one segment is broadcast by a broadcast system;

receiving a request for transmission of the at least one segment of said digitally encoded first-run programming content, wherein the at least one segment is beyond a current broadcast point that is before the segment publication time associated with the at least one segment;

transmitting the at least one segment of said digitally encoded first-run programming content prior to a normal broadcast time for said digitally encoded first-run programming content, wherein said at least one segment is enabled to playback before said associated segment publication time.

18. The method of claim 17, further comprising receiving a release code prior to transmitting a requested portion of said digitally encoded first-run programming content.

19. The method of claim 17, wherein the at least one segment of said digitally encoded first-run programming content is one of a plurality of digitally encoded first-run programming segments, and wherein at least one digitally encoded first-run programming segment has an associated segment publication time.

* * * * *

UNITED STATES PATENT AND TRADEMARK OFFICE
CERTIFICATE OF CORRECTION

PATENT NO. : 8,336,074 B2  
APPLICATION NO. : 11/402184  
DATED : December 18, 2012  
INVENTOR(S) : Oesterreicher et al.

Page 1 of 1

It is certified that error appears in the above-identified patent and that said Letters Patent is hereby corrected as shown below:

On Title Page 2, Item (56), under "OTHER PUBLICATIONS", in Column 2, Line 26, delete "(VOD)?"" and insert -- (VOD)?," --, therefor.

In the Specifications:

In Column 1, Line 13, delete "Programs,"," and insert -- Programs," --, therefor.

In Column 3, Line 41, delete "recording." and insert -- recording --, therefor.

In Column 5, Line 16, delete "maybe" and insert -- may be --, therefor.

In Column 5, Line 32, delete "h1" and insert -- In --, therefor.

In Column 5, Line 45, delete "Ts]3." and insert -- TSB. --, therefor.

In Column 6, Line 30, delete "server-310" and insert -- server 310 --, therefor.

In Column 6, Line 36, delete "In step" and insert -- in step --, therefor.

Signed and Sealed this  
Fourth Day of June, 2013

Teresa Stanek Rea  
*Acting Director of the United States Patent and Trademark Office*